United States Patent [19]

Darcy et al.

[11] Patent Number: 4,477,044
[45] Date of Patent: Oct. 16, 1984

[54] ELEVATOR FEEL ACTUATOR

[75] Inventors: Kevin A. Darcy, Seattle, Wash.; Terence F. H. Faithfull, Surrey, England

[73] Assignee: The Boeing Company, Seattle, Wash.

[21] Appl. No.: 458,516

[22] Filed: Jan. 17, 1983

[51] Int. Cl.³ ............................................. B64C 13/46
[52] U.S. Cl. ................................................. 244/223
[58] Field of Search ................. 244/78, 220, 221, 223, 244/226; 434/45; 91/387, 389, 364, 385, 386

[56] References Cited

U.S. PATENT DOCUMENTS

| 2,780,427 | 2/1957 | Keller et al. | 244/83 |
| 2,797,882 | 7/1957 | Servanty | 244/76 |
| 2,835,461 | 5/1958 | Westbury et al. | 244/83 |
| 2,881,631 | 4/1959 | Riccias | 244/223 |
| 2,912,193 | 11/1959 | Fowler | 244/83 |
| 3,045,957 | 7/1962 | Boyce et al. | 244/223 |
| 3,303,714 | 2/1967 | Fontaine | 74/470 |
| 3,747,876 | 7/1973 | Fortna et al. | 244/83 |
| 3,862,730 | 1/1975 | Heiney | 244/83 |
| 4,106,728 | 8/1978 | Griffith | 74/469 |

FOREIGN PATENT DOCUMENTS

WO82/02178  7/1982  PCT Int'l Appl. ................. 244/223

Primary Examiner—Trygve M. Blix
Assistant Examiner—Rodney Corl
Attorney, Agent, or Firm—Morris A. Case; B. A. Donahue

[57] ABSTRACT

A constant force mechanical spring and a varying force hydraulic actuator combine to provide feel to a pilot of his movement of an airplane's elevators. A constant force bias spring works against the hydraulic actuator to reduce the actuators effectiveness to nearly zero at minimum feel force conditions.

2 Claims, 3 Drawing Figures

ELEVATOR FEEL ACTUATOR

BACKGROUND OF THE INVENTION

On larger aircraft, when a pilot operates a device to actuate various control surfaces on the aircraft he is actually initiating action on two devices. His control column movement initiates the actuation of powered units that furnish the power needed to move the control surfaces, and it also actuates feel devices that resist movement of the control column to give the pilot the feel of the movement. One well-known means for providing the feel device calls for the combination of hydraulic actuators and a spring arrangement. The two units work together. For normal take-off and landings, the feel force must be low enough to allow one handed control operation. The minimum feel force that can be produced is determined by the minimum hydraulic pressure required in the hydraulic actuators, to overcome friction in the actuators, and the force provided by the spring mechanism. The spring force acts as the only source of control feel in the event of hydraulic system failure; so it must be sufficiently large to provide acceptable feel forces under those failure conditions. This presents a problem under normal conditions as the lowest practical hydraulic pressure in the hydraulic feel actuators when combined with the spring pressure, which spring pressure must be high enough for hydraulic failure conditions, creates too high a feel force during take-off and landings. In the past this has been solved by either adding additional hydraulic actuator redundancy and eliminating the spring arrangement or by adding a hydraulic actuator to restrain the spring force during normal operations and releasing it in the event of hydraulic actuator system failures. It was found that a simpler solution could be used that additionally would effect a weight savings.

SUMMARY OF THE INVENTION

The force applied by a pilot to actuate the elevators of an aircraft is resisted to provide a feel commensurate to the elevator movement. The resistive feel force is provided by the combination of hydraulic actuators having variable hydraulic pressures within the actuators to cover the feel range, a bias spring located to work against the hydraulic actuators to reduce the force in the hydraulic actuators to nearly zero during the lowest hydraulic pressures, and a supplementary spring strong enough to provide adequate feel even if the hydraulic actuators fail.

DETAILED DESCRIPTION

Figure 1:
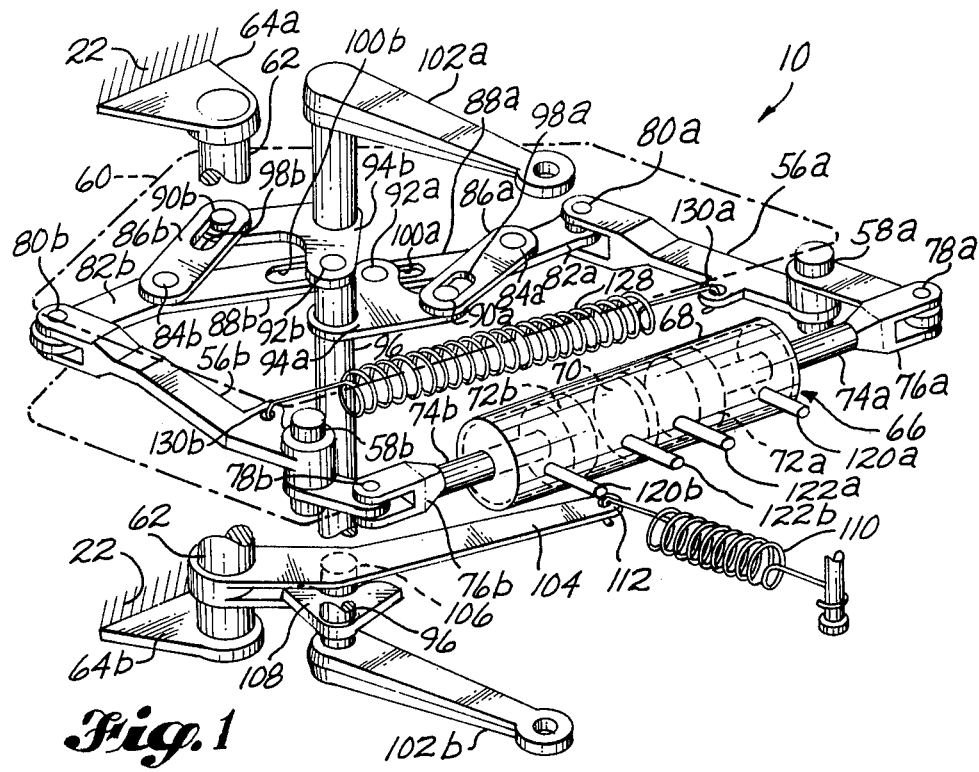
FIG. 1 shows a perspective view of the elevator feel system of this invention.
Figure 2:
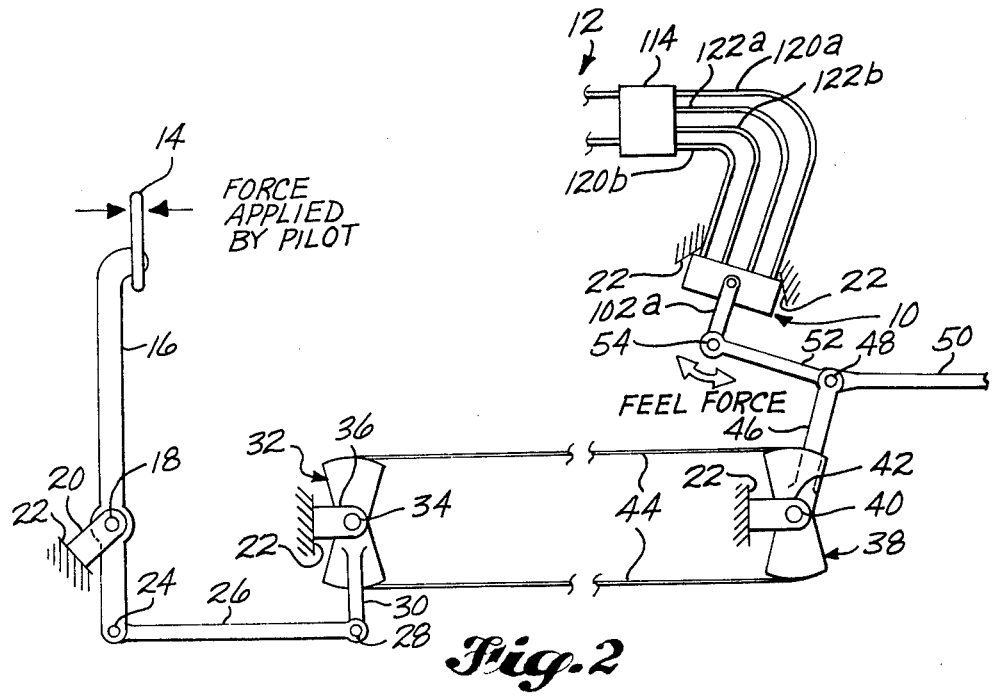
FIG. 2 shows a schematic view of an elevator control system for an aircraft using the feel system of this invention.

An elevator feel unit 10, as best shown in FIG. 1, is shown as part of a simplified schematic view of an elevator control system 12, in FIG. 2. In that figure control wheel 14 is movable by a pilot to rotate the cockpit control column 16. The column pivots around a pin 18; which is held by a yoke 20 which in turn is secured to symbolically shown airplane structure 22. The control column is pivotally connected at 24, to an end of a push rod 26; which has the other end pivotally connected at 28, to a lever arm 30 which extends out as part of a forward quadrant 32. This quadrant is pivotally mounted at 34, to a yoke 36, which is secured to the structure 22. An aft quadrant 38, is pivotally mounted at 40, by yoke 42 to the airplane structure. Cables 44 extend between the two quadrants. Lever arm 46 extends out from the aft quadrant, and is pivotally mounted at 48, to an elevator actuator rod 50, and also to an elevator feel push rod 52. The elevator actuator rod initiates powered units, not shown, that move the elevator control surfaces, not shown; while the elevator feel push rod is pivotally mounted at 54 to act against the elevator feel unit to provide a feedback to the pilot of the elevator position.

The elevator feel unit 10 has a pair of arms 56a and 56b that are spaced apart from each other. Part way along the length of each arm a vertical shaft 58a and 58b is joined to the arm and extends to be pivotally mounted to a support structure 60 shown in phantom. This support structure is joined to a vertical shaft 62. The ends of the shaft are supported by plates 64a and 64b, and the plates are secured to airplane structure 22. A hydraulic actuator 66 extends between one of the ends of the arms 56a and 56b. This actuator has a cylindrical chamber 68 which is divided into two operating parts by a solid block 70. The two operating parts have a piston 72a and 72b, a shaft 74a and 74b, which terminate in a yoke 76a and 76b, for pivotally mounting at 78a and 78b, to the arms 56a and 56b. At the opposite end, the arms are pivotally mounted at 80a and 80b, to the ends of linkages 82a and 82b, which are pivotally joined at the opposite end at 84a and 84b, to a pair of linkages 86a and 88a, and 86b and 88b. These double linkages are pivotally joined by pins 90a and 92a, and 90b and 92b to a plate 94a and 94b. These plates are each secured to a second vertical shaft 96, which shaft is pivotally mounted to support structure 60. At the ends of each of the double linkages, where those linkages are pinned to the plates 94a and 94b, the double linkages are slotted, see 98a and 100a, and 98b and 100b. These slots assure that the ends of the arms 56a and 56b will move inward regardless of the direction of rotation of shaft 96. Drive rods 102a and 102b are secured to the ends of the drive shafts. Rod 102a, as shown in FIG. 2, is pivotally joined at 54 to elevator feel push rod 52. From this it can be seen that rod 102a is actuated in response to a forward or reverse force applied by a pilot to the control wheel 14. Even though it is not shown, there is another control system, that parallels the schematic shown in FIG. 2, for the copilot. The copilot's system provides actuation to drive rod 102b. Actuation of the elevator control system 12, by either the pilot or copilot will provide that operator with a controlled feel of elevator position by the elevator feel system 10.

A lever arm 104, is pivotally mounted to vertical shaft 62. Part way out on the lever arm is a roller 106 which is located to be acted on by a cam 108, which is secured to the vertical shaft 96. A mechanical spring 110 is fastened to the free end 112, of the lever arm, and is located to continually urge the roller against the cam to provide resistance to rotation of shaft 96.

Figure 3:
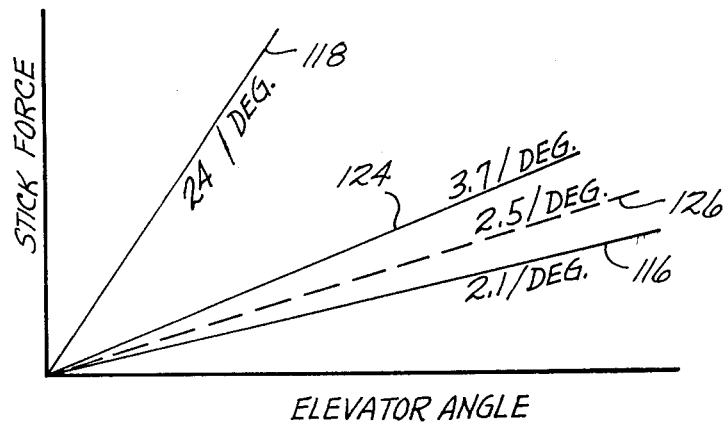
FIG. 3 shows a chart of stick force versus elevator angle of the elevator feel system of FIG. 1.

The hydraulic actuator 66 and the mechanical spring 110 work together to provide resistance to rotation of vertical shaft 96 whenever that shaft is rotated in response to movement of the pilot's or copilot's control column. This resistance of the elevator feel unit 10, provides a varying stick force/elevator gradient as a function of airplane speed and horizontal stabilizer position. The mechanical spring force 110 is constant while the force of the hydraulic actuator 66 is modulated in a feel computer 114, to provide a varying force gradient. The magnitude of the mechanical spring is determined by the need to provide a minimum stick force/elevator gradient for safe handling of the airplane in case of loss of hydraulics in the elevator feel system. The elevator feel system, however, must be low enough so that it can be operated with one hand during any take-off or landing. To meet these requirements the mechanical spring should provide a stick force/elevator gradient of about 2.1 pounds per degree of elevator movement (2.1 lbs./deg.). See line 116 of FIG. 3. In that figure, and under normal conditions, a maximum amount of about 24 lbs./deg. is required, see line 118, so that the pilot will feel sufficient stick force at the airplanes minimum stability condition. This is achieved with the feel computer supplying hydraulic fluid from a hydraulic pump, not shown, to the hydraulic actuator at about 2100 p.s.i. to impart 21.9 lbs./deg. to the actuator to be combined with the 2.1 lbs./deg. from the mechanical spring. The fluid is introduced through lines 120a and 120b, and return lines 122a and 122b. In reducing the feel computer pressure to lower the hydraulic actuator 66, for minimum stick feel/elevator gradient force, it is impractical to lower that pressure below about 150 p.s.i. due to actuator friction and pressure surges in the lines. At this pressure the combination of hydraulic and mechanical reaction gives $$\text{lbs./deg.} = \frac{(150)}{2100} (21.9) + 2.1$$

$$= 3.7 \text{ lbs./deg. See line 124}$$

This stick force/elevator gradient is too high for normal take-off and landings. It is about 50 percent greater than the required reaction 126, of about 2.5 lbs./deg. A bias spring 128, extends between arms 56a and 56b. This spring attaches to the arms at 130a and 130b, and is on the opposite side of the arm vertical shafts 58a and 58b from the hydraulic actuators 66 to act against the actuator with a constant force. This reduces the effectiveness of the hydraulic actuators, when the hydraulic pressure is at 150 p.s.i. for take-off and landing conditions, to an amount slightly above zero p.s.i. to provide excellent feel conditions for the pilot when that reaction is combined with the reaction from the mechanical spring 110.

We claim:

1. An airplane elevator movement feel mechanism comprising: a hydraulic feel unit responsive to elevator control movement, means for varying the reaction of the hydraulic feel unit to reflect varying aircraft operating conditions, a bias spring located to directly work against the hydraulic feel unit for partially counteracting the hydraulic feel unit to all but cancel out the hydraulic feel unit at the lowest hydraulic feel unit setting, and a spring means for supplementing the hydraulic feel units for providing the feel means in case of an emergency in the hydraulic feel units.

2. An airplane elevator movement feel mechanism comprising: a pair of pivotally mounted spaced apart arms, linkages to extend between and to pivotally join one end of the arms, means connected to airplane elevator controls for imparting movement to the linkages to move that end of the arms inward, a variable pressure hydraulic actuator to extend between and to pivotally join the opposite end of the arms to resist arm movement created by the linkages, a bias spring to extend between the arms and located to work against the hydraulic actuator and sized to nearly cancel the hydraulic actuator at the lowest pressure setting, and a spring located to be actuated in response to elevator control movement.

* * * * *